3,342,855
ALKYL 2-(FLUOROMETHYL) ACRYLIC ACID
PREPARATION
John Andrew Sedlak, Stamford, and George Charles Gleckler, Springdale, Conn., assignors to American Cyanamid Company, Stamford, Conn., a corporation of Maine
No Drawing. Filed June 18, 1964, Ser. No. 376,254
9 Claims. (Cl. 260—486)

The present invention relates to an improved process for the preparation of esters of 2-(fluoromethyl) acrylic acid. More specifically, the invention is concerned with the preparation of alkyl 2-(fluoromethyl) acrylates prepared from the corresponding alkyl 2-(chloromethyl) acrylates by halogen exchange in a direct and economical fashion.

Recently, it has been reported that alkyl 2-(fluoromethyl) acrylates can be prepared utilizing extensive syntheses which do not lend themselves to commercial adaptation. One such lengthy synthesis is described by Sing-Tuh Voong in Hua Hsüeh Hsüeh Pao, 24, 155–61 (1958) and abstracted in Chemical Abstracts, vol. 53 at pages 6064 and 6065. However, alkyl fluoromethyl acrylates have gained in acceptance due to their high softening points when polymerized to form fibers or films. If a straightforward procedure for preparing such fluoromethyl acrylates could be provided, a long recognized need would be satisfied.

It is, therefore, a principal object of the present invention to provide a direct halogen exchange process for synthesising alkyl 2-(fluoromethyl) acrylates from alkyl 2-(chloromethyl) acrylates. It is a further object of the invention to provide a novel procedure for preparing alkyl 2-(fluoromethyl) acrylates utilizing available reactants in the liquid phase whereby commercially acceptable yields of monomer are obtained. Other advantages will be ascertained from a consideration of the ensuing description.

To this end, it has been found, unexpectedly, that alkyl 2-(fluoromethyl) acrylate can be obtained in good yield and purity by reacting the corresponding chloromethyl acrylate derivative with an alkali metal fluoride in the liquid phase. Although the process of the invention involves the use of elevated temperatures, surprisingly there appears to be little or no polymerization found in the monomer obtained, notwithstanding the presence of available polymerization sites in both the chloromethyl acrylate monomer reactant and resultant 2-(fluoromethyl) acrylate product.

According to the process of the invention, at least equimolar proportions of an alkyl 2-(chloromethyl) acrylate and an alkali metal fluoride are reacted in the liquid phase at a pressure ranging from subatmospheric to superatmospheric pressure and at temperatures preferably between about 100° C. and 175° C. In general, halogen exchange is advantageously carried out at atmospheric pressure for from about one-half to seven hours so as to effect the recovery of desired alkyl 2-(fluoromethyl) acrylate monomer. Although equimolar proportions of the initial reactants can be used, it is preferred, however, to utilize a molar excess usually from about 50% to 100% of the alkali metal fluoride to insure the obtainment of optimum yields.

In general, the alkyl 2-(chloromethyl) acrylate reactant can be prepared by any suitable procedure. Exemplary of one such procedure is the chlorination of methyl methacrylate monomer at a temperature between 555° C. and 570° C. for from about 0.1 second to about 10 seconds and thereafter condensing the resulting reaction product to recover alkyl 2-(chloromethyl) acrylate. Illustrative reactants include: methyl 2-(chloromethyl) acrylate, ethyl 2-(chloromethyl) acrylate, n-propyl 2-(chloromethyl) acrylate, isopropyl 2-(chloromethyl) acrylate, n-butyl 2-(chloromethyl) acrylate, t-butyl 2-(chloromethyl) acrylate, n-pentyl 2-(chloromethyl) acrylate, sec-pentyl 2-(chloromethyl) acrylate, n-hexyl 2-(chloromethyl) acrylate, n-heptyl 2-(chloromethyl) acrylate and n-octyl 2-(chloromethyl) acrylate.

Exemplary of the alkali metal fluorides are: sodium fluoride, potassium fluoride, potassium bifluoride, sodium bifluoride and mixtures containing the same. It is advantageous to obtain maximum yields to utilize the fluoride reactant in a finely powdered, anhydrous form.

Although the reaction involving the one step halogen exchange contemplated by the present invention can take place in the liquid phase in the absence of a suitable inert solvent for the reactants, it is preferred, however, to include inert solvents so as to insure completion of reaction within the above specified time period. Such solvents include, for instance: tetramethylene sulfone, dimethyl sulfone, dimethyl formamide, N-methyl-2-pyrrolidone, hexamethylphosphorotriamide, tri-n-butyl phosphate and diethylene glycol.

Preferred embodiments are presented by way of the following examples which are not to be taken as limitative of the invention. Unless otherwise specified, the parts are by weight.

EXAMPLE 1

In a suitable reaction vessel equipped with immersion thermometer, sealed stirrer and reflux condenser, is added 190 parts of anhydrous tetramethylene sulfone, 41.4 parts of finely divided potassium fluoride and 47.9 parts of methyl 2-(chloromethyl) acrylate. The reaction mixture is vigorously stirred and gradually heated for about twenty minutes to 175° C. and maintained at the latter temperature for about 2 hours. Resultant mixture is then cooled to room temperature and the reflux condenser is replaced by a suitable connection to a dry ice-cooled receiver. Vacuum is thereafter applied to obtain a pressure of 16 mm. Hg while stirring and heating to a temperature of about 160° C. for 40 minutes. Condensate which is collected in the dry ice-cooled receiver constitutes principally methyl 2-(fluoromethyl) acrylate.

Resultant product is additionally purified by washing the product with saturated aqueous dibasic sodium phosphate and saturated aqueous sodium chloride, respectively. Thereafter the product is dried over anhydrous magnesium sulfate and distilled fractionally to obtain 35.1 parts of methyl 2-(fluoromethyl) acrylate having a boiling point ranging from 71.9° C. to 72.3° C. at 115 mm. Hg which corresponds to a 83% yield based on the methyl 2-(chloromethyl) acrylate reactant. Resultant product is further identified by its elemental analysis in percent as:

Calc. for $C_5H_7FO_2$: C, 50.85; H, 5.97; F, 16.09. Found: C, 50.79; H, 6.01; F, 16.43.

Resultant acrylate product is further established by its vapor phase chromatographic analysis and infrared spectrum. The latter shows absorptions at 1650 cm.$^{-1}$ for C=C and 1735 cm.$^{-1}$ for C=O.

EXAMPLE 3

The procedure of Example 1 is repeated in every detail except that 50 parts by weight of methyl 2-(chloromethyl) acrylate and 37.8 parts of finely divided, anhydrous potassium fluoride and 7.3 parts of finely divided potassium bifluoride are added to the reaction vessel.

The yield of methyl 2-(fluoromethyl) acrylate is found to be 32.9 parts, or 75% based on the methyl 2-(chloromethyl) acrylate reactant.

EXAMPLE 3

Example 1 is followed in every detail except that 48.8 parts of methyl 2-(chloromethyl) acrylate and 56.6 parts of finely powdered, anhydrous potassium bifluoride are utilized. Resulant reaction mixture is heated for about 6½ hours at 175° C. Conversion of methyl 2-(chloromethyl) acrylate is equal to 91% and the yield of methyl 2-(fluoromethyl) acrylate is 27.6 parts or 71% based on the reactant monomer employed.

EXAMPLE 4

Utilizing a quantity of sodium fluoride equivalent to the potassium fluoride of Example 1 and following the procedure of that example in every detail, it is found that 10% of the methyl 2-(chloromethyl) acrylate is consumed to form methyl 2-(fluoromethyl) acrylate.

Although methyl 2-(fluoromethyl) acrylate is prepared in each of the foregoing examples, other homologous 2-(fluoromethyl) acrylates are similarly obtained when substituting for the foregoing methyl 2-(chloromethyl) acrylate reactant the corresponding ethyl, propyl, butyl, pentyl or octyl 2-(chloromethyl) acrylate reactant.

It will be seen that the process of the invention is highly advantageous for the reason that, while utilizing temperatures between about 100° C. and 175° C., polymerization of the resultant monomer does not occur as had been expected when attempting to heat lower alkyl acrylates within the specified temperature.

What is claimed is:

1. An improved process for preparing alkyl 2-(fluoromethyl) acrylate, the steps which comprise: reacting (a) in an inert organic solvent an alkali metal fluoride dissolved therein, said fluoride being selected from the group consisting of sodium fluoride, potassium fluoride, sodium bifluoride, potassium bifluoride and mixtures thereof with (b) an alkyl 2-(chloromethyl) acrylate at a temperature between about 100° C. and 175° C. for from about one-half to about seven hours to effect halogen exchange, and recovering alkyl 2-(fluoromethyl) acrylate in good yield and purity.

2. The process according to claim 1 in which the inert solvent is tetramethylene sulfone.

3. The process according to claim 1 in which the alkali metal fluoride is potassium fluoride.

4. The process according to claim 1 in which the alkali metal fluoride is a mixture of potassium fluoride and potassium bifluoride.

5. The process according to claim 1 in which the alakli metal fluoride is sodium fluoride.

6. The process according to claim 1 in which the alkali metal fluoride is potassium bifluoride.

7. The process according to claim 1 in which the alkali metal fluoride is sodium bifluoride.

8. The process according to claim 1 in which the acrylate reactant is methyl 2-(chloromethyl) acrylate.

9. The process according to claim 1 in which the acrylate reactant is ethyl 2-(chloromethyl) acrylate.

References Cited

Bergman et al., J. Chem. Soc. (1953), pp. 3786–88.

Hudlicky, "Chemistry of Organic Fluorine Compounds" (1961), pp. 104–110.

Lovelace et al., "Aliphatic Fluorine Compounds" (1958), p. 3.

Quarterly Reviews, vol. XVI, 1962, pp. 46–51.

Reed et al., Journal of Polymer Science: Part A, vol. 2, pp. 1355–1363, March 1964.

LORRAINE A. WEINBERGER, *Primary Examiner.*

RICHARD K. JACKSON, *Examiner.*

A. P. HALLUIN, *Assistant Examiner.*